United States Patent
Pietrow et al.

(10) Patent No.: US 12,456,253 B2
(45) Date of Patent: Oct. 28, 2025

(54) SURFACE ASSESSMENT

(71) Applicant: ROLLS-ROYCE plc, London (GB)

(72) Inventors: Nikita Pietrow, Derby (GB); Donka Novovic, Birmingham (GB); David T Curtis, Birmingham (GB); Jamie C Mcgourlay, Derby (GB); Hassan Ghadbeigi, Sheffield (GB)

(73) Assignee: ROLLS-ROYCE PLC, London (GB)

( * ) Notice: Subject to any disclaimer, the term of this patent is extended or adjusted under 35 U.S.C. 154(b) by 283 days.

(21) Appl. No.: 18/325,457

(22) Filed: May 30, 2023

(65) Prior Publication Data

US 2023/0401786 A1 Dec. 14, 2023
US 2025/0173957 A9 May 29, 2025

(30) Foreign Application Priority Data

Jun. 13, 2022 (GB) ..................................... 2208573

(51) Int. Cl.
*G06T 17/00* (2006.01)
*G06T 7/00* (2017.01)

(52) U.S. Cl.
CPC ............ G06T 17/00 (2013.01); G06T 7/0004 (2013.01); *G06T 2207/20081* (2013.01); *G06T 2207/20084* (2013.01)

(58) Field of Classification Search
CPC .................. G06T 17/00; G06T 7/0004; G06T 2207/20084; G06T 2207/20081; G06T 7/001; G06T 2207/30164; G05B 19/4065; G05B 2219/37228; G05B 2219/37212; G05B 2219/37258; G05B 2219/37254; G05B 2219/37206; G05B 2219/37256; G05B 2219/37252; G05B 19/4099; G05B 19/4097
See application file for complete search history.

(56) References Cited

U.S. PATENT DOCUMENTS

| | | | | |
|---|---|---|---|---|
| 2014/0193064 | A1* | 7/2014 | Couse | G01N 21/8851 382/141 |
| 2018/0371914 | A1* | 12/2018 | Karigiannis | F01D 5/005 |
| 2019/0145183 | A1* | 5/2019 | Potash | E21B 10/00 700/175 |

FOREIGN PATENT DOCUMENTS

| | | |
|---|---|---|
| CN | 108710732 A | 10/2018 |
| CN | 111127533 A | 5/2020 |
| CN | 114417526 A | 4/2022 |
| KR | 10-2017-0031906 A | 3/2017 |

OTHER PUBLICATIONS

Dec. 8, 2022 Search Report issued in British Patent Application No. GB2208573.2.
Oct. 27, 2023 Search Report issued in European Patent Application No. 23174429.3.

* cited by examiner

*Primary Examiner* — Xilin Guo
(74) *Attorney, Agent, or Firm* — Oliff PLC

(57) ABSTRACT

A computer implemented method of modelling the degradation of at least a component within an abrasive environment, the method comprising: obtaining a 3D scan of a surface of a component, processing the surface images of the component, determining the surface properties, inputting the data into a trained prediction model, predicting the performance of the component, and simulating the surface evolution over time or use of the component.

14 Claims, 5 Drawing Sheets

SURFACE ASSESSMENT

BACKGROUND

This specification is based upon and claims the benefit of priority from UK Patent Application Number 2208573.2 filed on 13 Jun. 2022, the entire contents of which are incorporated herein by reference.

SUMMARY OF THE DISCLOSURE

The disclosure relates to a computer implemented method of assessing the degradation of a surface over time. In particular, the disclosure relates to a computer implemented method of controlling an abradable process.

BACKGROUND OF THE DISCLOSURE

Controlled abrasive surface removal process, such as abrasive surface removal, is an important method in engineering as it allows for finishing of components as well as cutting components. Uncontrolled abrasive surface removal is a process that occurs in other systems in which two components are in frictional contact with each other. Abrasive surface removal utilises the movement of an abrasive medium against a component to remove the material to which the abrasive is applied. Controlled abrasive surface removal is typically performed using a rotary abrasive disc/rotary tool to which a component is applied. The abrasive disc is a composite formed from abrasive particles forced and bound together into an abrasive tool. During either the controlled or uncontrolled abrasive surface removal processes not only is the material of the component removed but also some of the material from the other component in contact, or abrasive tool is shed. As such, the abrasive components will wear down through repeated use. Consequently, any abrasive tool or component that undergoes this process has a limited life span, which means that there is a point at which the component or abrasive tool is no longer performing its function and starts to cause damage rather than performing the functional task. Damage to the abrasive tool can also affect the surface quality of the component that has been worked on.

Monitoring of the abrasive surface removal process is therefore crucial to the process. At present there is limited means of monitoring the process outside of visual inspection or in the case of a machining process assessing of the quality of the component after the abrasive surface removal process has been completed. There has been some work on modelling of the process, but these processes are detailed and slow as they use kinematic modelling of the workpiece and the tool interaction. Currently, there is no way of identifying quickly and accurately an abrasive tool that is close to failure or when a component in a system may be ground beyond its useable life and when either needs to be replaced. Consequently, there is a need for an improved means of monitoring and assessing the quality of the abrasive tool, or rotary dressing tool or the surface of components that undergo an abrasive process.

SUMMARY OF THE DISCLOSURE

The scope of the disclosure is set out in the appended claims.

According to a first aspect of the disclosure there is provided a computer implemented method of modelling the degradation of at least a component having a non-planar surface profile with a granular structure within an abrasive environment, the method comprising:

obtaining a 3D scan of a surface of a component, with data from the 3D scan being processed into a surface image, processing the surface image of the component, determining surface properties of the component, inputting the 3D scan data into a trained prediction model, predicting a performance parameter of the component, and simulating a surface evolution over time or use of the component.

The trained prediction model may undergo a step of inputting training data, with the training data being specific to a particular operational process.

The inputted training data may be from calibration data of similar components that have been used in a similar environment under known conditions that are similar to the component will undergo.

The method may calculate a performance parameter of an abrasive tool, or rotary dresser or the surface of the component.

The step of determining surface properties may involve determining the number of grains and size or condition of any grains.

The step of processing the surface images of the component may involve planar slicing of the 3D image data from the component and generating binary images.

The planar slicing of the 3D image data from the component may also be used to calculate a range of overall component surface texture and abrasive grain level properties such as cutting-edge number evolution, grain packing density evolution, and active grain shape and size properties.

A remaining lifespan of the component may be estimated.

The simulating a surface evolution step may produce a simulation of the 3D grain geometry to reflect the predicated wear mechanisms.

The planar sliced image data may be used to calculate a total active area as well as the number of separate grains.

For every visible active grain one or more of the following parameters may be calculated: area, major diameter, orthogonal diameter, minor diameter, orientation, perimeter, equivalent circular diameter, aspect ratio, grain height, width in cutting direction, section modulus or any other shape or size properties.

There may be a further step of estimating the in process abrasive surface removal forces and/or power.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments of the invention will now be described by way of example with reference to the accompanying drawings in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
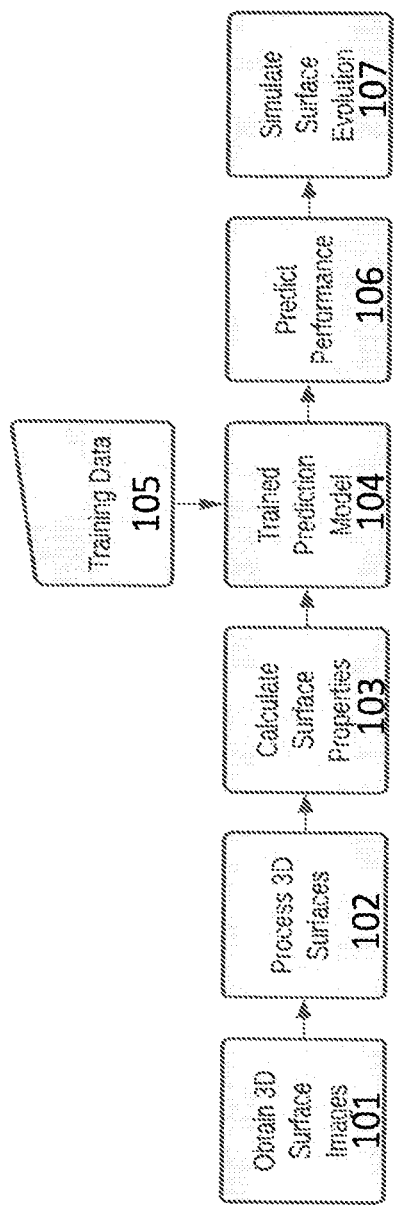
FIG. 1 presents a flow chart of operation of the disclosure.

The disclosure utilises a surface assessment of at least the abrading media to look at the effect on that component or the surface of the one that undergoes the abrading process. Abrading process occur in both the abrasive surface removal, polishing or working of a surface and alternatively during the use of a component in frictional contact with another. In the latter case this may be the degradation of a blade tip through interaction with the abradable liner of the casing, or, for example, the wear of brake pads on a vehicle or many other types of interaction between components as would be recognised by the person skilled in the art. FIG. 1 presents an example of the process for assessing the surface quality of an abrasive tool, or the effect of an abrasive material on a component. In step 101 three dimensional (3D) images of the abrasive component are taken. This can be done using any suitable tool. The abradable, maybe the abrasive tool, or dressing tool, or maybe the surface of the abradable liner of a gas turbine engine or any other two other components that interact as the components move relative to one another. Further 3D images of the material that the abrasive surface interacts with may be taken as well. In step 102 the 3D surface images are processed. This may be to match areas with scans of linked components, or maybe to break the scans down into smaller areas. Alternatively, the images may undergo planar slicing, cleaning, repairing missing data, filtering, or other image processing techniques. The surface properties are calculated in step 103. This step may involve mapping/plotting the heights of the features on the surface, and/or the size and shape properties of the abrasive material/particles. Alternatively, it may identify certain characteristics, such as large areas, or clusters of particles. These characteristics are important for assessing the performance and overall degradation of the components within the system. With the surface properties characterised the data can be fed into a trained prediction model in step 104. This processing step involves inputting the forces used within the process and/or the surface properties of the one or more of the components to address the degradation of one or more components involved in the system. If this calculation is done for the first time it will require training data to be inputted so that it knows how similar systems have performed; this is step 105 in which a training model for the process is created. The training data is taken from experimental measurements of the operation of similar, equivalent, or identical systems. The data being inputted into the model allows for the performance of the component or components to be predicted in step 106. This calculates how either the abradable material or the abrasive material will alter over time, perform in service and/or uses of running. This could for example be a calculation of lifespan of a component that sits in an abrasive area. For example, this could predict the lifetime of bearings or the lifespan of a dressing tool. The final step 107 is to simulate the surface evolution of the component or components within the system.

Figure 2:
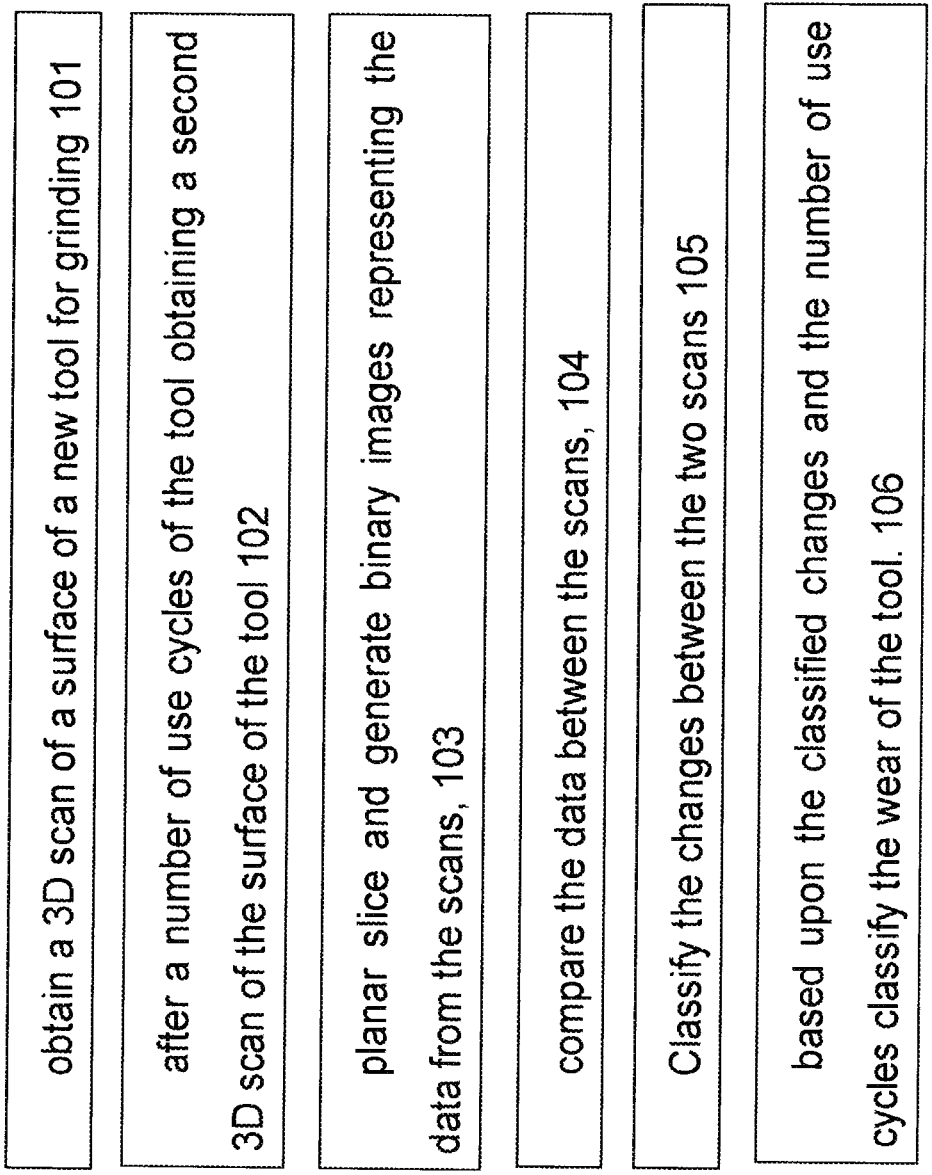
FIG. 2 presents a flow chart of an abrasive surface removal process according to the disclosure

An example of a process within the assessment of the degradation of the material over time is presented in respect of assessing the surface of an abrasive tool. The scan is used by a computer program to determine the expected lifespan of the abrasive tool. FIG. 2 shows a flow chart of the operation of a method according to the present disclosure. In 201 a 3D scan is initially taken of a surface of a new abrasive tool/dresser/abradable surface. The 3D scan can be acquired by any suitable surface scanning techniques as would be apparent to the person skilled in the art. 3D imaging/scanning techniques may be optical, contact or electrical. In 202 a second scan is taken after a number of wears of the abrasive tool. The data from the scans may be entered into a computer program to process the data. For example, the program may be MATLAB, but the methods employed may be programmed in other program languages or programs. The computer that runs the program may be any suitable computer.

The program can output at least two different capabilities. First is a basic predictive capability, which utilises the captured and imported 3D scan of the abrasive tool/dresser/abradable surface. In 203 a computer program processes the data by planar slicing and generating binary images representing assumed ideally an attritiously worn surface. These data entries can be used to estimate the in process abrasive surface removal forces and/or power. The binary slice data of a tool can also be used to calculate a range of overall tool surface texture and abrasive grain level properties such as cutting-edge number evolution, grain packing density evolution, and active grain shape and size properties. The data from this can then be used to assess performance. This level of assessment requires only a brief amount of time to perform. This amount of time may last only take several seconds and as such is much faster than more detailed analysis scans.

A further additional or alternate option is to perform a more advanced predictive calculation. For this calculation additional grain imaging-based calibration is required to be carried out on the scan data. In 204 data sets of the new and used tools are compared. In 205 the scan data is used to classify changes to the tool and individual abrasives between two scans. Step 206 based upon the classified changes and the number of use cycles classify the wear of the tool. With this calibration performed the program is able to perform a pixel-based measurement and calculation method, which is able to accurately determine the grain spacing in the cutting direction for every pixel row. This data can be combined with the grain protrusion height information and from this a calculation of chip thickness at a grain level is possible. Utilising this it is possible to allow for a classification of active and inactive grains. Additionally, by incorporating experimentally calibrated coefficients, which are based on a grain level imaging and wear assessment of the individual abrasive grains can be simulated allowing an estimation of the remaining tool life before tool replacement is necessary. In order to do this accurately, the 3D grain geometries are updated based on the predicted wear mechanisms, by deletion of the entire grain or portion of it. Thus, when combined together, all the information can be further utilised for the prediction of workpiece surface roughness evolution over the duration of the tool life. If continuous in process tool imaging is employed, the technique can serve as an additional tool for abrasive surface condition monitoring, by simultaneous comparison of the current condition to initial unworn state.

Figure 3:
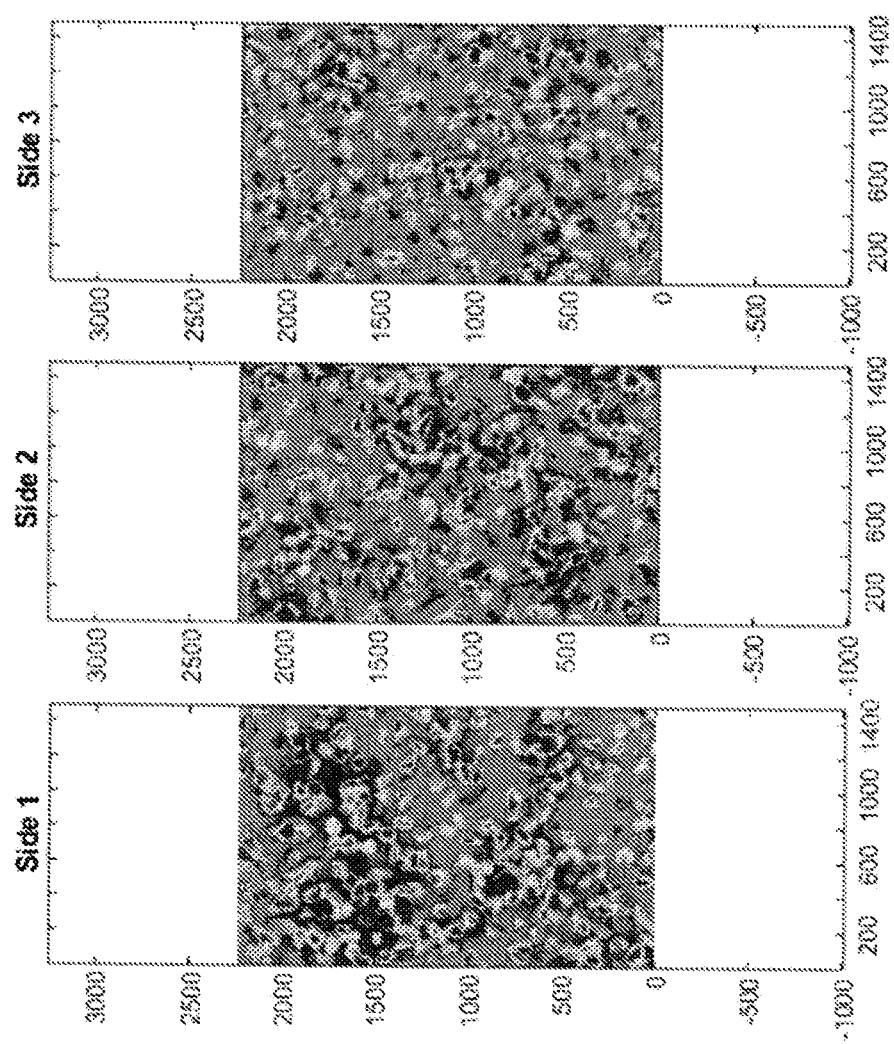
FIG. 3 presents an example of the data resulting from the scan of an abrasive surface.

FIG. 3 presents an example of the data resulting from the scan of an abrasive surface. This presents an initial step of the method in obtaining and importing the scan data. The scan represents the change in depth of the particles on the surface with red representing the particles which extend away from the substrate further and the blue green representing those closer to the plane. The scans are a representative sample of the entire tool surface. The higher the total area of the imported data the higher the model accuracy. However, this is at the increased cost of time for performing the calculations. As such, there is a balance to be drawn between the accuracy and the speed of the calculations that can be performed. This can be adjusted based on the needs of the data. Furthermore, the method is also designed to work with unprocessed data of the tool surface. This data may contain anomalies, contaminants and holes in the data which can all be expected during on-machine application of technique. With the data imported the second step of preprocessing the surface data from the scans. The 3D surface images are prepared for unit conversion of the scan data. In this step it is also possible to remove surface anomalies. It may also involve the optional repair of the missing data points. If such measurement data is available runout compensation may be applied to offset the surface data points higher or lower.

Figure 4:
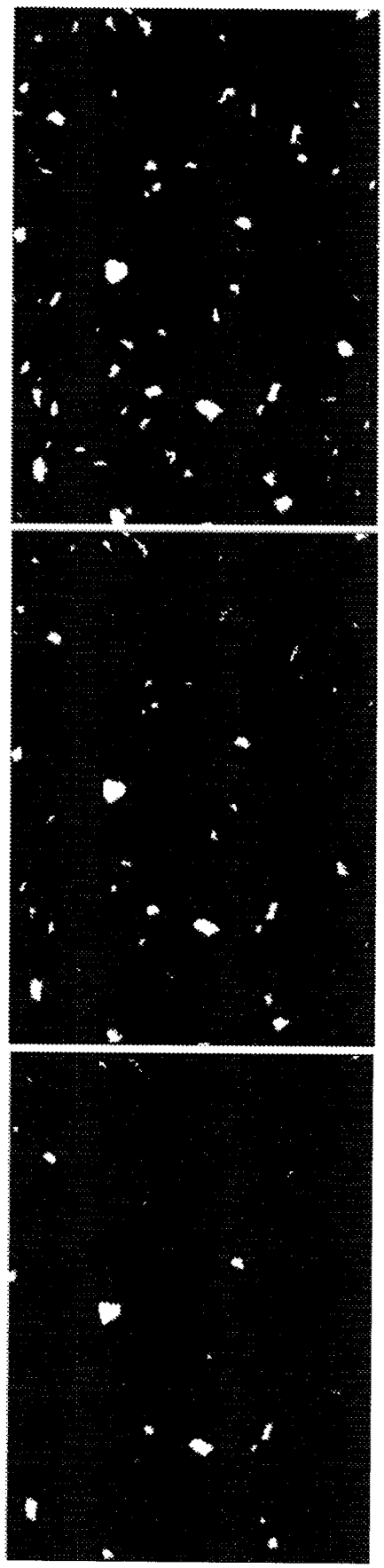
FIG. 4 presents the binary data slicing images.

With the data inputted and processed the data can undergo binary data slicing. This third step involves the slicing of the modelled 3D surfaces at predefined distances. These correspond to specific heights in the z-direction or steps. The processing of the steps can be set up to control the accuracy of the modelling, with the higher the accuracy there is also an increase in the time requirements relating to the calculations. By utilising a finer slicing resolution, it also increases the accuracy of the prediction. In this processing the 3D surface of the scan is processed such that data points which sit above the slice plane are set to a value of 1 and everything else is set to a value of 0. The slice plane is a set value above the tool surface that is used to "cut" the 3D surface into 2 halves. The model starts with a high value, and then loops through the predefined slice heights to build up the information about the surface at different levels. The result, of this processing is a set of binary images for each sliced surface. These images highlight the active protruding regions above the slicing plane (assuming all grain are active). In FIG. 4 the binary data slicing images are shown. In these images the black of the images correspond to the 0 values of the slice plane. The white points correspond to the points above the surface plane that have a value of 1. The examples present binary slice images at 10 µm, 15 µm and 20 µm from the outermost grain from left to right respectively. Thus, as can be seen from the images the further the distance from the image the greater number of particles that are seen in the image. For each of the sliced planes calculations can be carried out to determine the total active area as well as the number of separate grains. The active area represents an assumed ideal attritiously worn area i.e., if no wear by fracture or pull-out occurred, and all grains wear at the same rate.

Once the data has been imported a basic predictive capability of the abrasive tool or component can be assessed. As discussed above there are two levels of detail that can be obtained from the inputted data. A prediction of the abrasive surface removal power and the force can be achieved through the following equation:

$$P' = P'_{ch} + P'_{sl} + P'_{pl} = u_{ch}(av_w) + \mu p_a A v_s \sqrt{(ad_s)} + F'_{pl} v_s = \frac{F_t v_s}{b} \quad (1)$$

Wherein A is the predicted ideal wear flat area, $u_{ch}$ is the chip formation specific energy, $\mu$ is the friction coefficient, $p_a$ is the contact pressure and $F'_{pl}$ is the ploughing force coefficient of the abrasive surface removal system as determined. This relationship links together the behaviour of a single layer abrasive tools, cutting parameters and the measured wear flat area.

In order to perform the above calculation, there are a number of experimental characteristics that need to be determined. The characteristics that require experimental calibration are the friction coefficient, chip formation specific energy, ploughing force coefficient, and contact pressure. In order to calculate these the following steps are required to be carried out. 3D Imaging of test tool or component in its new condition should be taken to get an accurate profile of the surface. With the tool or component imaged it is required to perform extended abrasive surface removal tests. These tests need to be carried out on the tool or component until measurable wear flats develop. One way of doing this is that the tests can be performed at a fixed feed rate and depth of cut and may be carried out at two different cutting speeds, however alternative methods can be used as would be appreciated by the Person Skilled in the Art. The abrasive surface removal forces and power for every pass may be recorded. Once the tests are completed 3D surface images are captured of the worn test tools or components after abrasive surface removal so that the differences before and after the tests can be identified. With these tests performed it is possible to calculate gradient of recorded Normal Forces vs Tangential Forces to calculate the friction coefficient ($\mu$) using the following formula:

$$F_n = \frac{1}{\mu} F_t + \frac{\mu F_{n,c} - F_{t,c}}{\mu} \quad (2)$$

From the data of the calibration tests, it is possible to use the power or recorded tangential cutting forces with a new condition tool surface (i.e. when no wear flats are present) at two cutting speeds, to calculate the chip formation specific energy ($u_{ch}$) and ploughing force coefficient ($F'_{pl}$):

$$P' = \frac{F_t v_s}{b} = u_{ch}(av_w) + F'_{pl} v_s \quad (3)$$

Finally, the calculated coefficient and measure wear flat area following abrasive surface removal are substituted back into the equation to calculate the contact pressure ($p_a$):

$$P' = \frac{F_t v_s}{b} u_{ch}(av_w) + \mu p_a A v_s \sqrt{ad_s} \quad (4)$$

The ploughing force coefficient can be ignored altogether; this removes the need to carry out two tests at two different cutting speeds. However, ignoring the ploughing force coefficient does result in a minor reduction in model accuracy. If the ploughing force is calculated, it improves the accuracy of the model. Repeating the calibration process can be done, so as to improve the accuracy of the calibration. Furthermore, it is also possible to estimate the calibration coefficients with reasonable accuracy based on workpiece and tool material properties. In such a case no experimental calibration is required, however, there is a reduction in the accuracy of the prediction.

Figure 5:
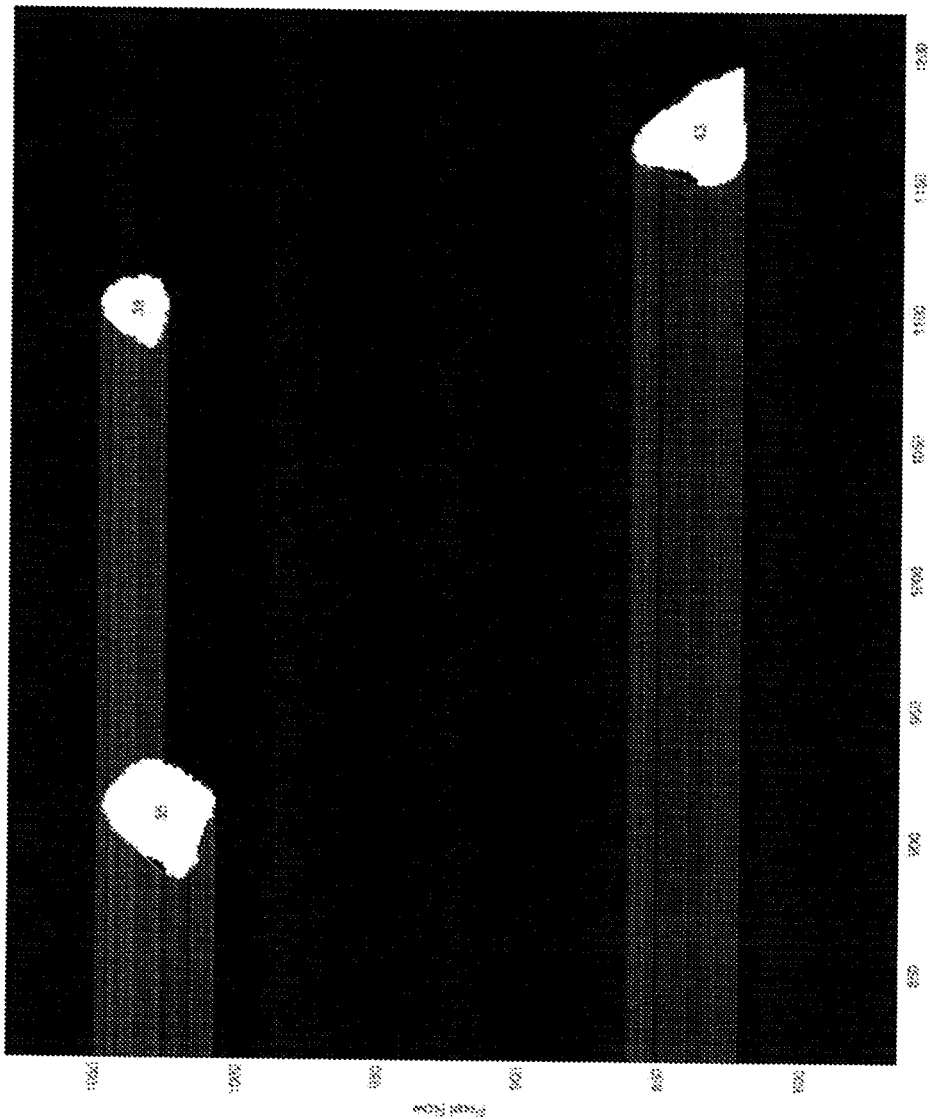
FIG. 5 presents an example of the results of such calculations.

The binary slicing of the surface of the abrasively removed surface also allows for enhanced calculations of advanced surface and grain characteristics. In this, step 5, individual grains are identified and labelled. However, in most cases, especially at bond level, the grains are overlapping or touching. Individual abrasives can be separated through the use of image processing, application of AI models, or other algorithms. With the grains separated and identified detailed information regarding the shape and size properties of every grain at every slice can be calculated. For every visible active grain it is possible to calculate the following parameters: area, major diameter, orthogonal diameter, minor diameter, orientation, perimeter, equivalent circular diameter, aspect ratio, grain height, width in cutting direction, section modulus, and more can be easily added. This allows for an in-depth assessment of the grains on the surface of the abrasive tool or features on the surface of a component, correlation with cutting behaviours, and later, inform wear mechanisms predictions. Once the grains are identified the grain spacing can be calculated. The spacing can be calculated by determining the separation for every grain to preceding grains by way of calculating the pixel spacing for every row pixel row. An example of the results of such calculations is shown in FIG. 5. In cases where there are no preceding grains are visible an average grain value is assigned. Using this information, the chip thickness for each grain is independently calculated. In these calculations the height difference with respect to any other grain is taken into account. If it is determined that the grain is not protruding enough or are too close to preceding grain, then these result in negative chip thickness values. These grains will not participate in material removal and are therefore ignored in any further calculations for the abrasive surface removal purpose. The process is then repeated for further grains.

In step 6 the grain level wear is predicted. The complete information on the size, shape, and chip thickness properties of every grain, as well as the calibration data has been derived from the earlier steps. Using this as a basis it is possible to predict the wear mechanisms that are likely to occur. To enable prediction wear of individual abrasive grains or surface features, in depth visual assessment of their behaviour during abrasive surface removal can be performed. This may utilise scanning electron microscope imaging of the abrasive surface of the tool. However, as will be appreciated by a person skilled in the art, there are a number of different visual assessment techniques that are suitable. The appropriate choice of technique will depend on the nature of the abrasive grains, and/or its size and/or the process. The accuracy of these measurements is important because they are used to determine the critical values that are used for classifying the different wear mechanisms. As such, in order to obtain the information required to determine those critical values the following steps are required: Imaging of the surfaces in multiple tracked locations at high magnification. With this image coordinates must be tracked from a locating feature, such as by providing a small indentation on the tool. This needs to be done for the tool or component before and after abrasive surface removal tests that are carried out over varying durations to simulate different stages of wear. With before and after images a side-by-side comparison of the new and worn condition images can be carried out to identify changes and differences between the images. If 3D data is available, an overlay method may be employed to improve the accuracy of the classification. 3D data may be aligned on top of the SEM images in order to create a composite 3D overlay SEM image. This provides a composite image that combines the high quality of the SEM image with the surface height information that is difficult to interpret from the greyscale images alone. All visible abrasive grains or surface features may be compared and classified using manual or automated wear mechanisms classification methods. This can be performed alongside the classification and obtaining additional information on the grain shape; this for example may be determining the size and chip thickness using the Matlab assessment methodology, as discussed. The correlation of the classification and grain properties may be investigated and critical values for the grains may be determined. This may be done through machine learning, in which images are fed into the system so that the computer learns to discriminate the properties of the grains. Such application may increase the speed and accuracy of the process. Composite overlay images can be created as discussed; the presence of these images can help to greatly facilitate the classification decision making regarding the identification of the grains. These images may be created through the use of image registration techniques, which are able to transform and crop the larger 3D dataset to match it with the SEM image. This can be done in any suitable program. For example, this may be performed in Matlab. Thus, the on-machine assessment of abrasive tool/dresser or component condition can provide enhanced information for the operator regarding the key process variables. By utilising the predictive capability of the assessment technique allows for early detection of tool failure and estimated tool life; this leads to reduced workpiece scrapping and rework rate. Furthermore, the use of force prediction can inform fixture and process or component design. One option to do this is to assess the grain properties against critical values, which have been determined experimentally. Alternatively, a machine learning approach may be used with the machine taught to recognise the properties from scan of similar shaped chip and to compute how these may behave. The main mechanisms for damage on single layer abrasive tool are by pull out, severe fracture, macro fracture, micro fracturing, and attrition. For the purpose of this predictive assessment, these wear mechanisms can be grouped by the severity or volume of grain loss into two key groups: Severe (including pull out and severe fracture) and Regular (including fracture and attrition). Severely worn grains lose all or a majority of their volume as a result of wear, whereas regular wear represents grain that are flattened or lose only a small fraction of their volume. Every imaged grain that has been previously identified as active is therefore classified into one of these two groups based on critical values of chip thickness, size and shape. Next, the grains that are identified as severely worn are deleted from the 3D surface data completely; this simulates their removal from the tool surface, which is the likely effect on them. Regularly worn grains, however, are assumed to flatten and only the grain tips are deleted from the surfaces. This outlined process is repeated across all imaged tool sides for each of the identified grains. Once all of the surfaces have been updated to reflect the predicted wear the next cutting pass can be simulated by processing the next surface slicing position. At this stage it is also possible to simulate the resultant workpiece surface roughness by considering the surface texture of the active grain tips. Thus, it is possible to simulate the likely effect of wear on the abrasive surface of the abrasive surface of the abrasive tool. Thus, with the defect mechanisms modelled it is possible to model the life span of the tool. This is used in step 7 to assess when stable abrasive surface removal conditions are reached (required run-in time) and when the tool should be replaced/discarded.

The process may be further enhanced by utilising many additional features. This may include the incorporation of other machine sensor data, which will lead to improved accuracy of the modelling. It can also be useful in the allowing for automatic calibration and/or training. Additionally or alternatively, continuous imaging of the tool or component surface may be employed; this leads to a real time condition assessment and wear detection. Furthermore, this can also provide the detection or flagging of abrasive tool or component discontinuities or anomalies to the user. The above description is more focussed around abrasive tool and dresser operations, but the technique is transferable to a range of other abradable surface operations for both controlled and uncontrolled abrasive processes. Thus, although the detail of the process is set out to provide an overview of the process for use on abrasive wheels, the process and system as discussed above is applicable for studying any surface undergoing an abrasive process, and/or performing an abrasive process.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A computer implemented method of modelling the degradation of at least a component having a non-planar surface profile with a granular structure within an abrasive environment, the method comprising:
    obtaining a 3D scan of a surface of athe component, with data from the 3D scan being processed into a surface image,
    processing the surface image of the component,
    determining surface properties of the component,
    inputting the 3D scan data into a trained prediction model,
    predicting a performance parameter of the component, and,
    simulating a surface evolution over time or use of the component, and
    determining when the component should be replaced based on the simulated surface evolution, wherein
    simulating the surface evolution includes calculating grain properties of grains in the granular structure of the component, classifying each of the grains based on the grain properties, and deleting at least a portion of each respective grain based on the classification.

2. The computer implemented method of claim 1, wherein the trained prediction model undergoes a step of inputting training data, with the training data being specific to a particular operational process.

3. The computer implemented method according to claim 2, wherein the inputted training data is from calibration data of other components that have been used in the same operational process that the component will undergo.

4. The computer implemented method according to claim 1, wherein the method calculates a performance parameter of an abrasive tool, or rotary dresser or the surface of the component.

5. The computer implemented method according to claim 1, wherein the determining surface properties includes determining the number of grains and size or condition of any grains.

6. The computer implemented method according to claim 4, wherein the step of processing the surface images of the component involves planar slicing of the 3D image data from the component and generating binary images.

7. The computer implemented method according to claim 6, wherein the planar slicing of the 3D image data from the component is also used to calculate a range of overall component surface texture and abrasive grain level properties such as cutting-edge number evolution, grain packing density evolution, and active grain shape and size properties.

8. The computer implemented method according to claim 6, wherein a remaining lifespan of the component is estimated.

9. The computer implemented method according to claim 8, wherein the simulating a surface evolution step produces a simulation of the 3D grain geometry to reflect the predicated wear mechanisms.

10. The computer implemented method according to claim 8, wherein the planar sliced image data are used to calculate a total active area as well as the number of separate grains.

11. The computer implemented method according to claim 8, wherein for every visible active grain one or more of the following parameters are calculated: area, major diameter, orthogonal diameter, minor diameter, orientation, perimeter, equivalent circular diameter, aspect ratio, grain height, width in cutting direction, section modulus or any other shape or size properties.

12. The computer implemented method according to claim 1, wherein there is a further step of estimating the in process abrasive surface removal forces and/or power.

13. A computer implemented method of modelling the degradation of at least a component having a non-planar surface profile with a granular structure within an abrasive environment, the method comprising:
    obtaining a 3D scan of a surface of athe component, with data from the 3D scan being processed into a surface image,
    processing the surface image of the component,
    determining surface properties of the component,
    inputting the 3D scan data into a trained prediction model,
    predicting a performance parameter of the component, and,
    simulating a surface evolution over time or use of the component, and
    determining when the component should be replaced based on the
    simulated surface evolution, wherein
    the trained prediction model undergoes a step of inputting training data, with the training data being specific to a particular operational process, and
    the inputted training data is from calibration data of other components that have been used in the same operational process that the component will undergo.

14. A computer implemented method of modelling the degradation of at least a component having a non-planar surface profile with a granular structure within an abrasive environment, the method comprising:
    obtaining a 3D scan of a surface of athe component, with data from the 3D scan being processed into a surface image,
    processing the surface image of the component,
    determining surface properties of the component,
    inputting the 3D scan data into a trained prediction model,
    predicting a performance parameter of the component, and,
    simulating a surface evolution over time or use of the component, and
    determining when the component should be replaced based on the simulated surface evolution, wherein the method calculates a performance parameter of an abrasive tool, or rotary dresser or the surface of the component, and the determining surface properties includes determining the number of grains and size or condition of any grains.

* * * * *